June 21, 1938.  F. C. FRANK  2,121,146
WHEEL
Filed March 14, 1932
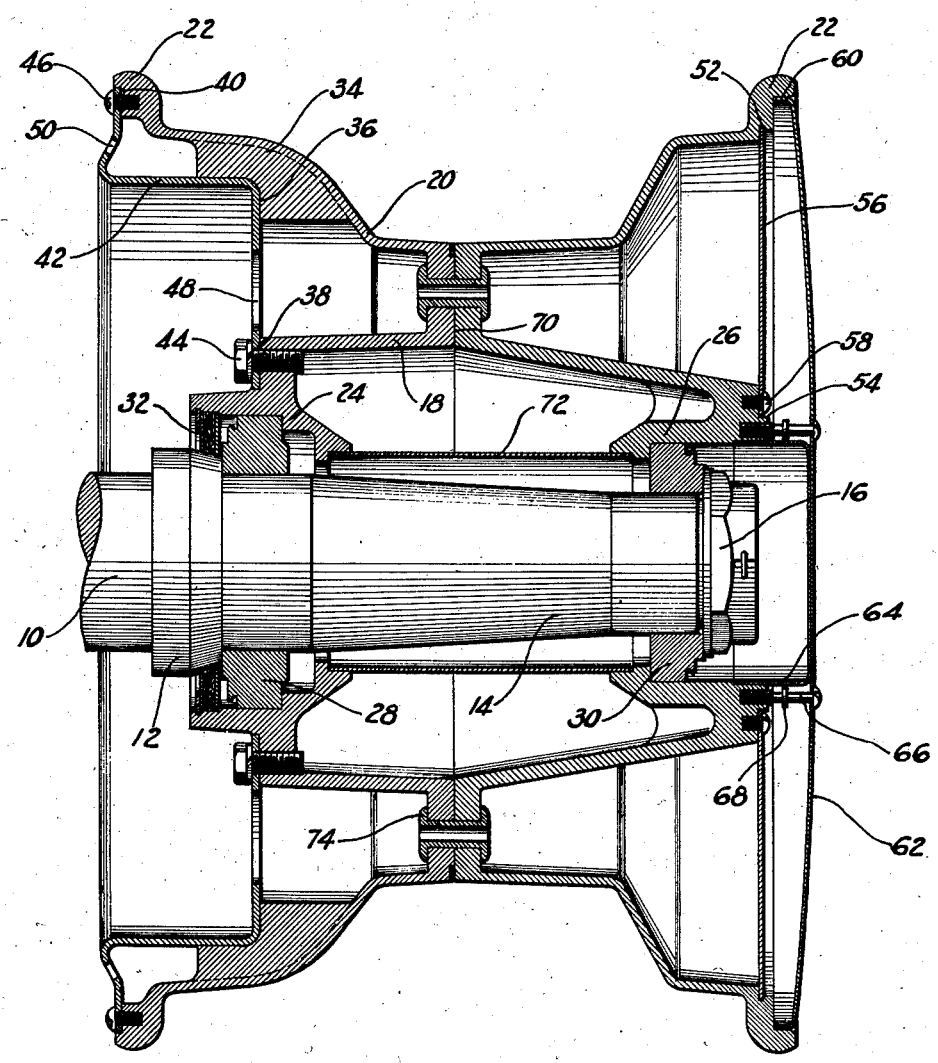
INVENTOR.
FREDERICK C. FRANK
BY
ATTORNEY Patented June 21, 1938

2,121,146

UNITED STATES PATENT OFFICE 2,121,146

WHEEL

Frederick C. Frank, South Bend, Ind., assignor to Bendix Aviation Corporation, South Bend, Ind., a corporation of Delaware Application March 14, 1932, Serial No. 598,809

1 Claim. (Cl. 301—37)

This invention relates to wheels and more particularly to wheels for aircraft or motor vehicles.

Broadly, the invention comprehends a wheel structure including two castings bolted or otherwise secured together. Preferably the castings are of an aluminum alloy, each including a portion of a hub and a portion of a rim which when assembled provide a highly durable hub and rim connected by a central web. A radial load carrying disc and a combined radial load carrying disc and brake drum, are fitted in the respective ends of the wheel to provide a substantial structure which may be manufactured at a low cost.

An object of the invention is to provide a wheel of a simple structure comprising a relatively few parts in which the required machine work is reduced to a minimum, and which may be easily and quickly assembled.

Another object of the invention is to provide a wheel structure including a hub and a rim and a radial load carrying disc which may be secured to the rim without the use of securing means.

A further object of the invention is to provide a wheel including a hub and a rim and a brake drum connecting these parts arranged to take the radial load imposed upon the wheel.

Yet a further object of the invention is to provide a wheel including two simple castings which may be easily secured together to provide a hub and a rim.

A feature of the invention is a two-part casting bolted or otherwise secured together to provide a hub and a rim.

Another feature of the invention is a wheel including a hub and a rim and a radial load carrying disc pressed into position between these parts.

A further feature of the invention is a fairing for the wheel including a disc having a peripheral flange fitted snugly under a tire retaining flange on the wheel, and a unique means for securing the fairing against displacement.

Other objects and features of the invention will appear from the following description taken in connection with the drawing, which form a part of this specification, and in which:

The single figure is a vertical sectional view of a wheel embodying the invention.

Referring to the drawing for more specific details of the invention, 10 represents an axle having a shoulder 12 and a spindle 14 threaded to receive the conventional retaining nut 16. Positioned for rotation on the axle is a wheel including two aluminum castings bolted or otherwise secured together. As shown, the wheel includes a hub 18 and a rim 20 provided with the conventional tire retaining flanges 22. The hub 18 has the usual shoulders 24 and 26 for the reception of suitable bearings 28 and 30 and a grease retaining washer 32. The bearing 28 is positioned on the spindle 14, between the shoulder 24 and the shoulder 12 on the axle, and the bearing 30 is positioned on the spindle between the shoulder 26 and the retaining nut 16.

The rim 20 has a plurality of radially disposed webs 34 arranged in spaced relation and provided with corresponding shoulders 36. These shoulders are oppositely disposed with respect to an annular shoulder 38 on the hub, and the adjacent retaining flange on the rim is provided with an annular shoulder 40.

A brake drum 42 fitted in the hub, is supported on the annular shoulders 36, 38 and 40. The drum is bolted to the hub as indicated at 44, and the flange of the drum is secured on the shoulder 40 as by driven screws 46. The drum is provided with a plurality of openings 48, and the rim of the drum is provided with a plurality of openings 50, so that air may freely circulate between the rim of the wheel and the drum to effectively cool the drum.

The outer retaining flange 22 has a circumferential groove or slot 52 disposed in a plane with a shoulder 54 on the hub. A radial load carrying disc 56 is fitted in the hub and is suitably secured thereto as by driven screws 58. The radial load carrying disc has its periphery positioned in the slot or groove 52. In practice the radial load carrying disc is pressed into position and accordingly the use of fastening means for securing the disc to the rim is eliminated.

The tire retaining flange 22 is formed to provide an annular shoulder 60 arranged to effectively support a fairing 62. As shown, the fairing has a peripheral flange which fits snugly on the shoulder beneath the tire retaining flange. The fairing may be formed integral with a grease retaining cup 64 fitted in the end of the hub or this cup may be formed as a separate part. The fairing is retained in position by screws 66 threaded into the end of the hub. As shown, the screws are mounted for rotation in the fairing and a portion of the screws are cut away to receive a loose washer 68, to prevent accidental displacement of the screws.

In practice, the two aluminum alloy castings are machined as indicated at 70, so that they may be properly fitted together, and in assembly a suitable sleeve 72 is fitted between the castings where it is permanently retained upon securing the castings together by suitable rivets 74, after which the brake drum and radial load carrying discs are assembled. It is, of course, to be understood that the grease retaining cup and the fairing are not attached until the wheel has been placed upon an axle.

Although this invention has been described in connection with certain specific embodiments, the principles involved are susceptible of numerous other applications that will readily occur to persons skilled in the art. The invention is, therefore, to be limited only as indicated by the scope of the appended claim.

Having thus described the various features of the invention what I claim as new and desire to secure by Letters Patent, is:

A wheel comprising a casting comprising a hub and a rim, a tire retaining flange on the rim having an annular shoulder, a grease cup fitted in the end of the hub, a fairing retaining the grease cup in the hub, and having its periphery seated on the annular shoulder on the tire retaining flange, and means carried by the fairing for retaining the fairing and grease cup against displacement.

FREDERICK C. FRANK.